(12) United States Patent
Uusitalo

(10) Patent No.: US 6,366,777 B1
(45) Date of Patent: Apr. 2, 2002

(54) USING TWO SIM CARDS WITH SAME MSISDN NUMBER

(75) Inventor: Markku Uusitalo, Lempäälä (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/308,890

(22) PCT Filed: Nov. 24, 1997

(86) PCT No.: PCT/FI97/00714

§ 371 Date: May 26, 1999

§ 102(e) Date: May 26, 1999

(87) PCT Pub. No.: WO98/24257

PCT Pub. Date: Jun. 4, 1998

(30) Foreign Application Priority Data

Nov. 27, 1996 (FI) .................................................. 964732

(51) Int. Cl.⁷ ................................................. H04Q 7/20
(52) U.S. Cl. ....................... 455/433; 455/558; 455/432; 455/550; 455/551
(58) Field of Search ................................ 455/558, 432, 455/433, 550, 551, 435; 379/58, 59, 357, 63

(56) References Cited

U.S. PATENT DOCUMENTS

| | | | | | |
|---|---|---|---|---|---|
| 5,657,373 A | * | 8/1997 | Hermansson et al. | ....... | 455/435 |
| 5,875,404 A | * | 2/1999 | Messiet | ...................... | 455/558 |
| 5,933,785 A | * | 8/1999 | Tayloe | .......................... | 455/558 |
| 5,956,653 A | * | 9/1999 | Lahti | ........................... | 455/558 |

FOREIGN PATENT DOCUMENTS

| | | |
|---|---|---|
| EP | 669 774 | 8/1995 |
| WO | 94/08433 | 4/1994 |
| WO | 94/28686 | 12/1994 |
| WO | 95/12293 | 5/1995 |

* cited by examiner

Primary Examiner—Daniel Hunter
Assistant Examiner—Lana Le
(74) Attorney, Agent, or Firm—Pillsbury Winthrop LLP

(57) ABSTRACT

A method and equipment for using two SIM cards with the same MSISDN number in a mobile communication system. To at least one subscriber identifier are allocated at least two identity modules (SIM), of which only one at a time can be registered as active. In connection with location updating it is checked whether the location updating relates to a subscriber identifier to which at least two identity modules (SIM) have been allocated. If yes, it is checked whether the identity module (SIM) concerned is at that particular moment registered as passive, and if yes, it is activated 3and the identity module (SIM) earlier registered as active is deactivated. If the identity module (SIM) earlier registered as active is involved in an on-going call while location updating is being performed using an identity module (SIM) earlier registered as passive, the location updating is rejected or delayed until the on-going call has been terminated.

4 Claims, 4 Drawing Sheets

US 6,366,777 B1

USING TWO SIM CARDS WITH SAME MSISDN NUMBER

This application is the national phase of international application PCT/FI97/00714 filed Nov. 24, 1997 which designated the U.S.

FIELD OF THE INVENTION

The invention relates to a method and equipment for using two SIM cards with the same MSISDN number in a mobile communication system.

BACKGROUND OF THE INVENTION

In order to illustrate the invention, but in no way to restrict it, the invention is described within a GSM system (Global System for Mobile Communications) and using its terminology. As shown in FIG. 1, the structure of the GSM network consists of two main parts: a Base Station Subsystem (BSS) and a Network Subsystem (NSS). The BSS and mobile stations MS communicate via radio connections. In the BSS, each cell is served by a Base Transceiver Station (BTS). A group of base transceiver stations BTS is connected to a Base Station Controller (BSC), the function of which is to control the radio frequencies and channels used by the base transceiver station BTS. The base station controllers BSC are connected to a Mobile Switching Centre (MSC). The function of the mobile switching centre is to switch calls involving at least one mobile station MS. Some MSCs are coupled to other data communication networks, such as a Public Integrated Services Network (PISN), and they comprise switching functions for processing calls to and from these networks. These mobile switching centres are called Gateway Mobile Switching Centres (GMSC or Gateway MSC).

The GSM system has two types of databases for routing calls. Network subscriber data are stored, permanently or semi-permanently, at a Home Location Register (HLR). These data include, for instance, information about those services the subscriber has access to and the subscriber's current location. The other register type is a Visitor Location Register (VLR). It is usually connected to a single mobile switching centre MSC, but it can also serve several centres. The Visitor Location Register is commonly integrated in the mobile switching centre MSC. An integrated network element such as this is briefly called a VMSC (Visitor MSC). When the mobile station MS is active (it has registered in the network and can initiate or receive a call), the majority of the subscriber data concerning the mobile station MS in the Home Location Register HLR is loaded (copied) into the Visitor Location Register VLR of the mobile switching centre MSC in whose area the mobile station MS is located.

Base stations BTS continuously broadcast information about themselves and their environment. The information comprises e.g. a location area identifier, base station identifier, base station type and what is known as adjacent cell information. When a mobile station MS is locked to the base station of a specific cell, it also monitors the transmission quality of the base stations indicated by the adjacent cell information sent by the base station BTS, and changes over to one of these base stations if the coverage of the current base station degrades. A cellular radio network usually knows the location of a mobile station with the accuracy of what is known as a Location Area (LA). A location area usually includes a suitable number of predefined cells and their base stations. Location area data, for instance a Location Area Index (LAI), sent by a base station informs the mobile station of the location area that the base station BTS belongs to. When the mobile station MS changes cells within the same location area, location updating to the cellular radio network is not needed. But when the mobile station changes over to a new base station and notices on the basis of the location area data—for instance the LAI—that the location area changes, the mobile station initiates location updating by sending a location update request to the cellular radio network. As a result of this location update request the network stores the new location area of the mobile station in its subscriber registers. The location updating in the GSM system given as an example is described e.g. in Mouly-Pautet, "*The GSM System for Mobile Communications*", particularly chapter 7.1.4, and in the ETSI recommendation "GSM 03.12, Location Registration Procedures DCS, ETSI/PT 12".

FIG. 2 illustrates signalling relating to location updating. In FIG. 2 it is assumed, similarly as in the GSM system, that a mobile subscriber's MSISDN identifier (Mobile Subscriber ISDN) is not used on the radio path. Instead, an IMSI identifier (International Mobile Subscriber Identity) or a TMSI identifier (Temporary Mobile Subscriber Identity) is used in order to protect the subscriber's identity. In step 2-1 the mobile station MS sends a location update request Loc_Update_Req, which proceeds (via the base station BTS and the base station controller BSC) to the mobile switching centre MSC. In step 2-2 the mobile switching centre MSC sends a location update command to the visitor location register VLR, which performs the update in step 2-3. In step 2-4 the visitor location register VLR sends an acknowledgement to the mobile switching centre MSC to the effect that the location updating has been performed, the MSC forwarding the acknowledgement Loc_Update_Ack to the mobile station MS in step 2-5.

The IMSI (or the TMSI) and the mobile subscriber's MSISDN are associated with each other in the home location register HLR in a way described for instance in Mouly-Pautet, "*The GSM System for Mobile Communications*", particularly chapter 8.1.1.3. To sum up, the home location register maintains a conversion table or file associating a specific MSISDN number with a specific IMSI number. Table T in FIG. 3 represents this table.

FIG. 3 illustrates the set-up of a call terminating at a mobile station MS in a GSM mobile communication system. If the mobile station MS given in FIG. 1 is not located within the area of its own home location register, the parts in FIG. 2 correspond to those in FIG. 1, with the home location register HLR and the visitor location register VLR being, however, connected to different mobile switching centres MSC. In step 3-1 the call arrives at the Gateway Mobile Switching Centre (GMSC), which in step 3-2 defines, on the basis of the directory number MSISDN of the called subscriber, the subscriber's home location register HLR and sends it an inquiry concerning routing information. Information indicating the visitor location register VLR in the area of which the subscriber is located has been updated to the subscriber's home location register HLR in connection with location updating. In step 3-3, on the basis of this information, the home location register HLR sends a request Provide Roaming Number to the visitor location register VLR. The mobile subscriber's IMSI is also sent to the visitor location register VLR in this request. In step 3-4 the VLR stores the data it has received and reserves a Mobile Station Roaming Number (MSRN). In step 3-5 the VLR sends the roaming number MSRN it has reserved to the home location register HLR, which in step 3-6 transmits it to the centre GMSC which inquired the routing information. A roaming number domain is defined in such a way that a call is always routed to that mobile switching centre MSC whose visitor location register VLR has reserved the roaming number concerned. On the basis of the roaming number MSRN, the gateway mobile switching centre GMSC can thus route the call forward by sending in step 3-7 an initial address message to the mobile switching centre MSC indicated by the roaming number MSRN. In this example the mobile switching centre MSC concludes from the roaming number MSRN that the call will terminate in the area of its own centre. In step 3-8 the mobile switching centre MSC inquires of its own visitor location register VLR the called subscriber's information for setting up the call. In a normal case the visitor location register VLR returns in step 3-9 the information needed for setting up the call. Arrows 3-10 and 3-11 describe this process.

In the exemplary GSM system, authentication of the mobile subscriber requires an identity module which is subscriber-specific. A terminal equipment proper is therefore not confined to a specific. subscriber. The subscriber identity module, such as a SIM card (Subscriber Identity Module), is a functional card or a smart card which is placed in the mobile station and which contains information, e.g. an authentication key $K_i$, needed for identifying a subscriber and for encrypting radio traffic. In the present application, a subscriber identity module, such as a SIM card, refers to a functional card that is used in a mobile station and can usually be removed from it and by means of which the subscriber is able to use a card controlled mobile station.

In other words, if a subscriber identity module, e.g. a SIM card is used, the user need not necessarily have a mobile station of his own. Instead, it is sufficient that he has a subscriber identity module issued by a mobile communication system operator, such as a SIM card, which is, in a way, a phone card and which the subscriber can use for making and receiving calls from any mobile station in the system. The function of the SIM card is, on the one hand, to offer subscriber identifying data for the use of the mobile station in a well protected form and, on the other hand, to provide services for the mobile station. Such services include e.g. maintaining (entering, changing) a personal identification number, maintaining a data encryption key, i.e. authentication key $K_i$, and unblocking a SIM card blocked due to too many attempts to enter a wrong Personal Identification Number (PIN). A blocked SIM card is unblocked for instance with a PUK code (Personal Unblocking Key).

An alternative introduced for implementing a SIM card in hand-held phones is a component called a plug-in-SIM, which is about the size of a coin and contains the electronics of the SIM card of a credit card size. The plug-in-SIM is inserted into the phone in such a way that it is not easy for the user to replace it. The phone can also have an incorporated plug-in-SIM and, in addition, a card reader. When there is a card in the card reader, the phone is identified on the basis of the external card, otherwise on the basis of the incorporated plug-in-SIM card.

In the present application a Mobile Station (MS) thus consists of two elements: a Mobile Equipment (ME) and a Subscriber Identity Module (SIM). The SIM card is specified in GSM recommendation 02.17. Recommendation 11.11 specifies in closer detail the matters defined in recommendation 02.17 by determining for instance the protocols between the SIM and the ME, the exact contents and length of the SIM data fields and matters relating to electronic and mechanical interfaces. An example of a data field included in the SIM card is IMSI, the number identifying the mobile subscriber. Further, in the present application, the concept SIM refers to a subscriber identity module in general, e.g. to a SIM card, a small plug-in-SIM card, a SIM smart card of a credit card size and a subscriber identity module incorporated into a mobile station and containing the subscriber identity and the authentication key $K_i$, unless the context gives reason to some other interpretation.

The above described prior art subscriber registration into the system, location updating and call set-up are usually sufficient when a single subscriber has one telephone set and one SIM card at a time at his disposal. A problem this invention offers a solution for arises when a single subscriber has two identity modules which he wishes to associate with the same subscriber number. A situation like this can arise for instance when the subscriber has two different telephone sets, one of which uses a full size SIM card and the other one a small SIM card. One of the telephones can be a pocket-size portable phone which is used in locations where the network coverage is good. The other can be for instance a large and high-power telephone equipped with an external antenna and used in a car or a boat. The subscriber wishes to have a SIM card for both telephones, but does not want to pay for two separate subscriptions. Another similar situation arises in countries where legislation requires that if an employee has a company telephone at his disposal, it should be possible to separate calls made outside the working hours from those made during the working hours. Usually, however, the subscriber wishes that he can be reached with the same subscriber number, irrespective of whether he is contacted during or outside the working hours.

BRIEF DESCRIPTION OF THE INVENTION

The object of the invention is to provide a method and equipment implementing the method where a single mobile subscriber can have two different SIM cards of either the same or a different size at his disposal; the subscriber can be always reached with the same subscriber number; the implementation should be as simple, reliable and unnoticeable as possible to the subscriber. The objects of the invention are achieved with methods and arrangements characterized by what is stated in the independent claims. The dependent claims relate to the preferred embodiments of the invention.

The invention is based on a mobile telephone network (for instance its home location register HLR) maintaining information that a subscriber identifier (an MSISDN number) is associated with two or more SIM cards, of which one at the most, however, is active at a time. (Usually one of the SIM cards is active, but when an active SIM card is being changed, a temporary situation where none of the SIM cards is active can arise.) When a mobile station which has a SIM card registered as passive performs location updating, the network (for instance the home location register HLR) notices that the MSISDN number is associated with two SIM cards, of which the one that is currently passive is performing location updating. In this case the network deactivates the SIM card used earlier and activates that SIM card which is used for performing the location updating. The operation then continues as normally.

One advantage the method and system of the invention offer is that they are reliable and unnoticeable to the subscriber. All the subscriber has to do is to use his telephone. From the subscriber's point of view, the switch between an active and a passive SIM card takes place automatically, without a separate spoken or keyed message to a billing centre or the like. An implementation according to the invention is possible irrespective of whether the SIM cards are of the same or a different size. A further advantage the method and equipment of the invention can be considered to have is that the changes can be limited to a small, clearly defined area in a single network element, mainly in software and information elements associated with the home location register HLR.

BRIEF DESCRIPTION OF THE DRAWINGS

The invention is now described in more detail in connection with preferred embodiments, and with reference to the attached drawings of which

DETAILED DESCRIPTION OF THE INVENTION

Figure 4:
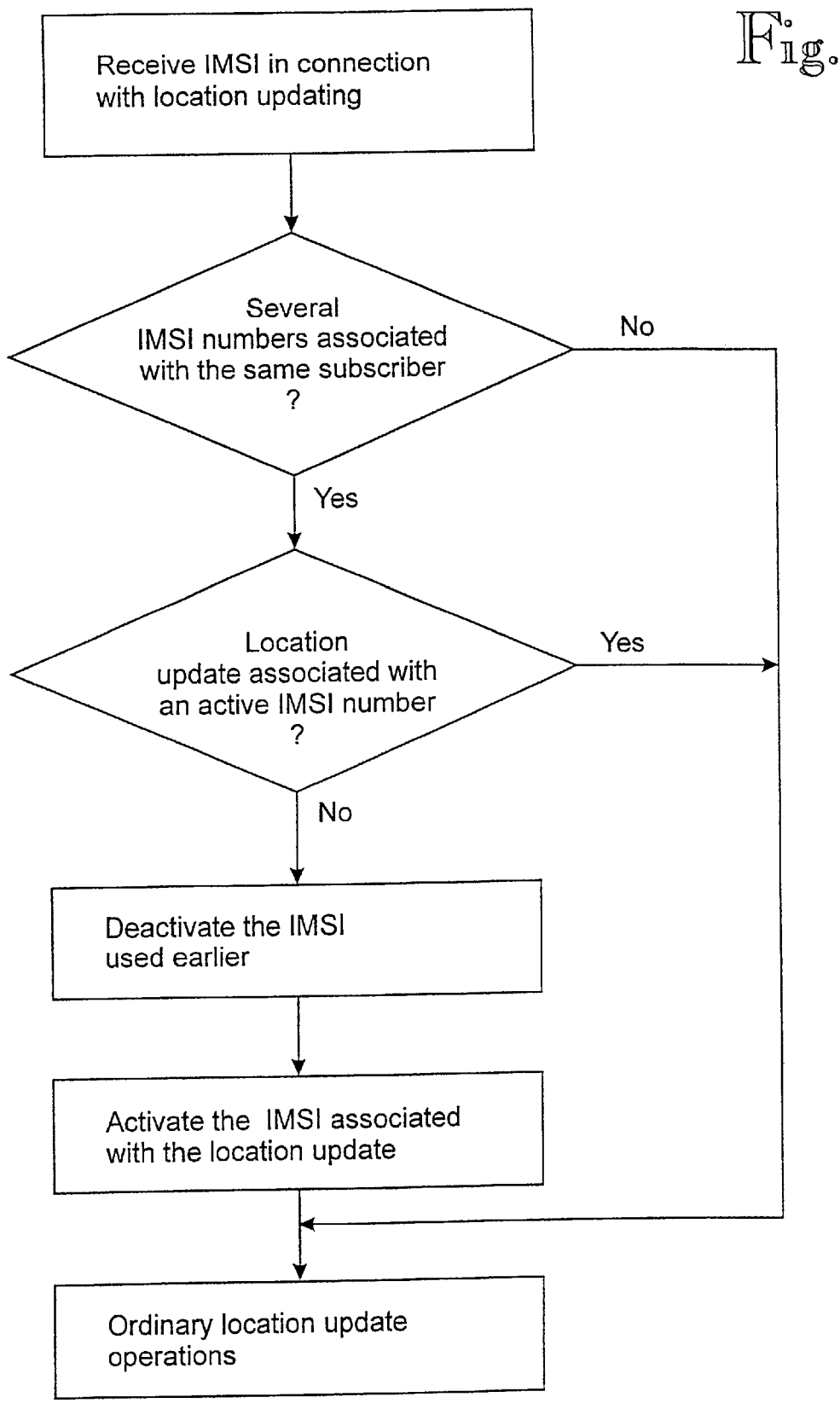
FIG. 4 is a flow diagram illustrating the invention.

FIG. 4 is a flow diagram showing additional operations of the invention relating to location updating Receiving an IMSI in connection with location updating involves checking whether other IMSI identifiers are associated with the same subscriber. If yes, then it is checked whether the location updating relates to an IMSI identifier registered as active. If the location updating relates to an IMSI identifier registered as passive, the IMSI used earlier is deactivated and the IMSI associated with the location updating is activated.

Figure 1:
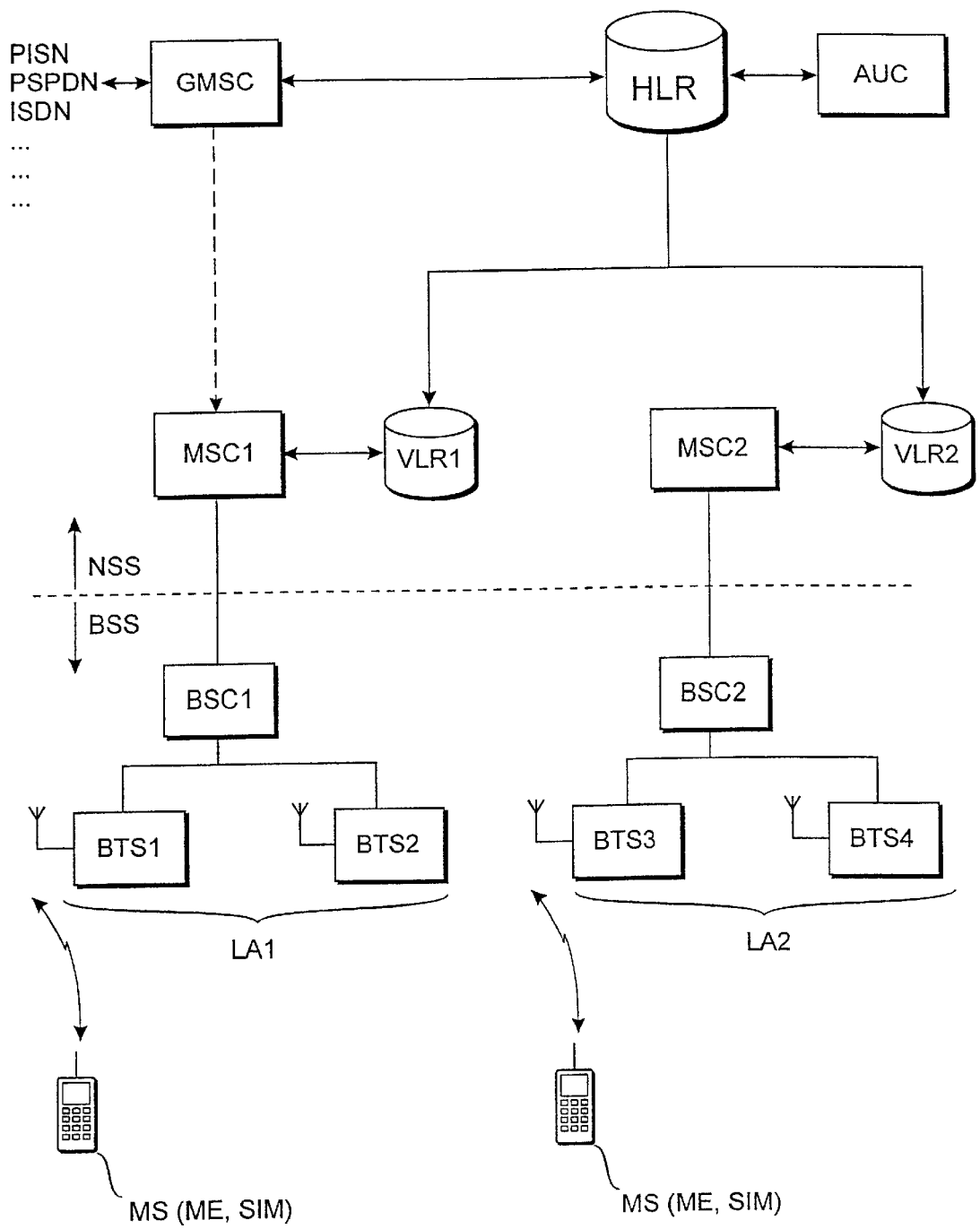
FIG. 1 is a block diagram showing elements of a mobile telephone network essential to the invention.
Figure 2:
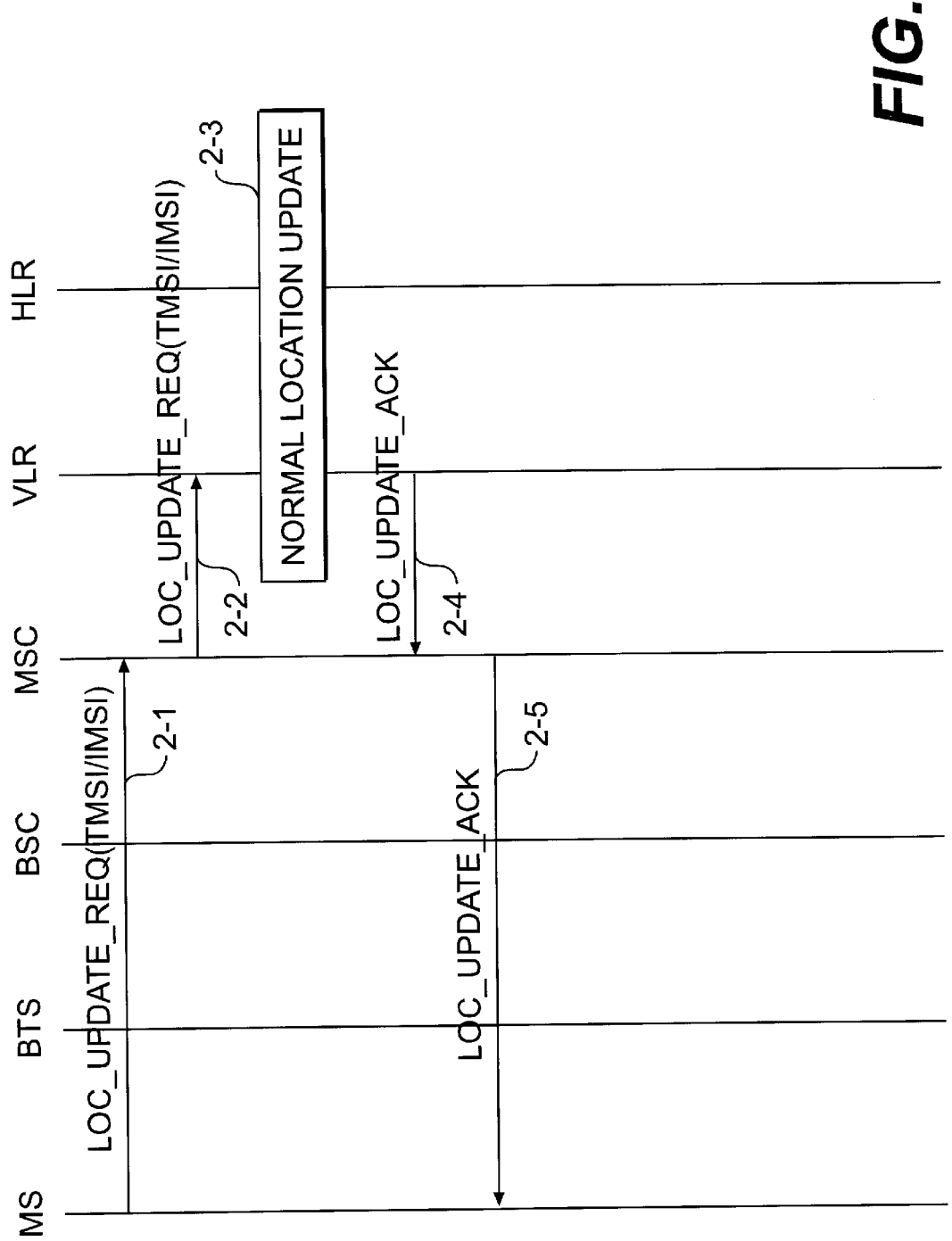
FIG. 2 illustrates signalling relating to location updating.
Figure 3:
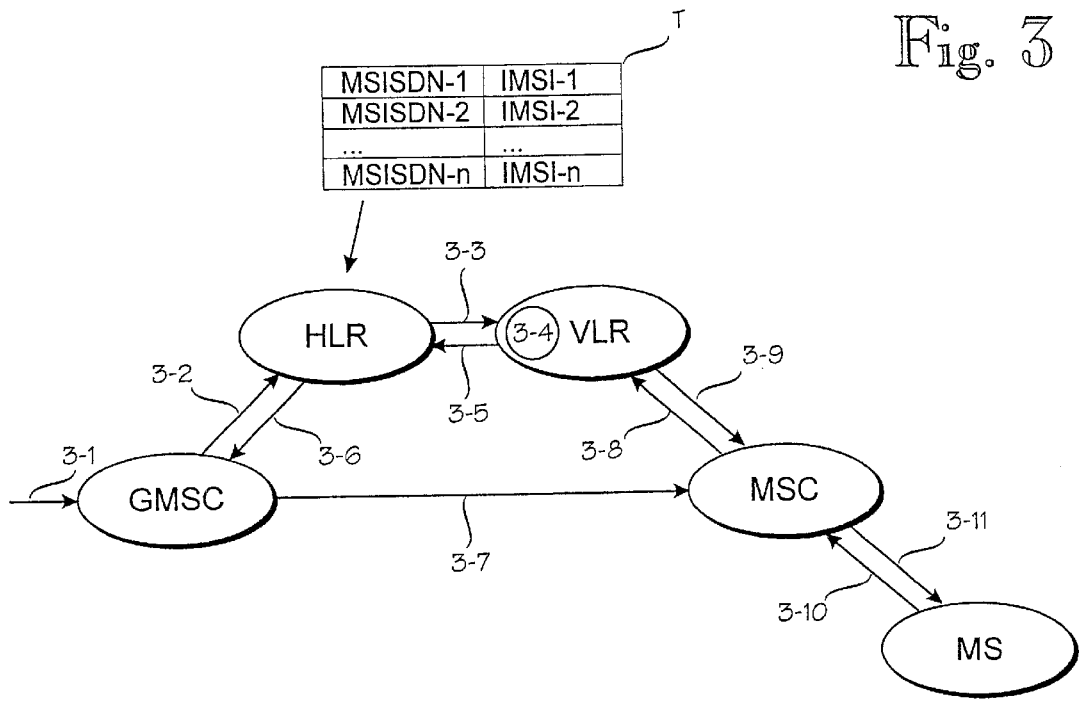
FIG. 3 illustrates signalling relating to call set-up.
Figure 5A:
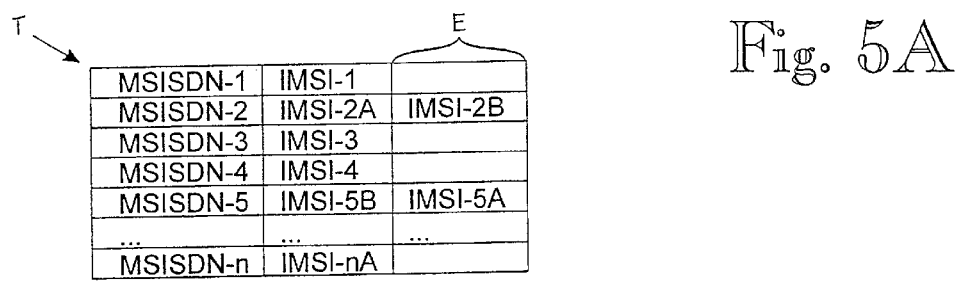
FIGS. 5A–5B show alternative techniques for associating several SIM cards with one and the same subscriber number.

Referring now to FIG. 5A, in one embodiment of the invention the home location register HLR maintains, as described in the invention, information indicating that at least two SIM cards are associated with a particular MSISDN number. This information can be maintained for instance by extending the conversion table T described in connection with FIG. 3 with an extra information element E in such a way that two or more IMSI identifiers can be entered in extended table T for each MSISDN number. It is to be noted in this first embodiment that the record format of the data file, i.e. of the table T,. changes, which has to be taken into account when the software processing the table concerned is updated. If more than two IMSI identifiers (SIM cards) are to be obtained for each MSISDN number, more than one extra information column E will naturally be required.

According to this alternative, when the home location register HLR notices in connection with location updating that the location updating relates to an MSISDN number associated with more than one SIM card, the HLR checks whether the SIM card indicated by the location update message is the one registered as active (i.e. whether the IMSI corresponding to the SIM card in table T is stored in the first IMSI field). If yes, then the location updating proceeds according to prior art. But if the SIM card indicated by the location update message is not the one registered as active (i.e. the IMSI corresponding to the SIM card in table T is stored in a field other than the first one), the HLR activates the IMSI indicated by the location update message, for instance by transferring it into the first IMSI field. The SIM card corresponding to this IMSI now becomes active. The IMSI used earlier is deactivated, e.g. by storing it in the IMSI field just released. The deactivation of the SIM card used earlier is signalled to the visitor location register VLR for instance by sending a Mobile Application Part (MAP) message CANCEL LOCATION corresponding to the SIM card just deactivated. The visitor location register VLR deletes the deactivated SIM card from its memory. This is a standard operation for the visitor location register, so the invention does not require any changes in the visitor location register functionality.

An alternative for transferring the active IMSI into the first column is to maintain a separate field (not shown) which indicates which one of the IMSIs of a particular subscriber is active.

FIG. 5A shows, as an example, an imaginary situation where a second and a fifth subscriber (MSISDN number) are associated with two SIM cards and thus two IMSI identifiers. As regards the second subscriber, SIM card A is active (IMSI-2A is in the first IMSI field). Correspondingly, as regards the fifth subscriber, SIM card B is active (IMSI-5B is in the first IMSI field).

Figure 5B:
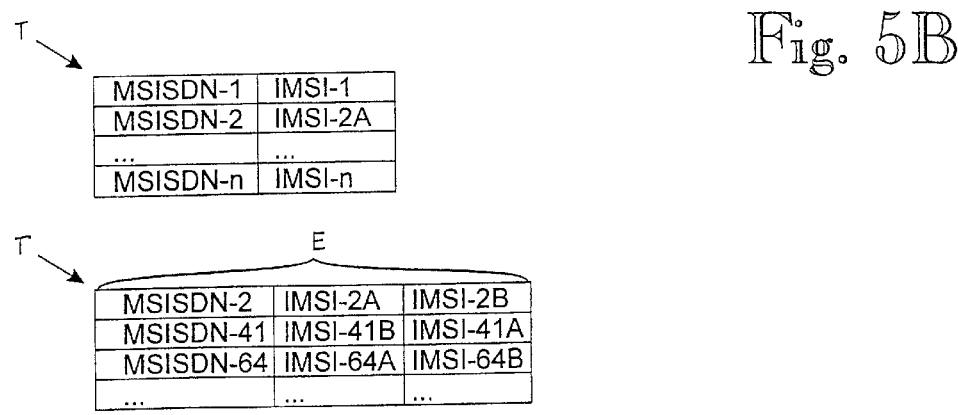

Referring now to FIG. 5B, one alternative embodiment is based on the fact that probably only a small fraction of the subscribers use several SIM cards. According to this second alternative, several SIM cards can be associated with one and the same MSISDN number by means of additional extension table T' which only holds information about MSISDN numbers with more than one associated SIM card. In this embodiment, the record format of table T does not change, but all changes are collected into the separate extension table T'. In certain situations this can be considered an advantage. The processing of table T only changes in such a way that when a SIM card is changed (in connection with location updating), the IMSI corresponding to the activated SIM card must be copied into table T.

According to this second alternative, the home location register HLR checks in connection with location updating whether the MSISDN indicated by the location updating is stored in extension table T'. If not, the location updating continues according to prior art. But if the MSISDN indicated by the location updating is stored in extension table T', the HLR checks whether the SIM card indicated by the location update message is the one registered as active (i.e. whether the IMSI corresponding to the SIM card in extension table T' is the same as the one entered in table T). If yes, the location updating continues according to prior art. But if the SIM card indicated by the location update message is not the one registered as active (i.e. the IMSI corresponding to the SIM card in extension table T' is not the same as the IMSI entered in actual table T, the HLR copies the IMSI indicated by the location update message from extension table T' to actual table T. At the same time, a CANCEL LOCATION message is sent to the visitor location register VLR similarly as described above in connection with FIG. 5A. The location updating then continues according to prior art.

FIG. 5B shows, as an example, an imaginary situation where two SIM cards, and thus two IMSI identifiers, are associated with each MSISDN number 2, 41 and 64. For one of the subscribers SIM card A is active (IMSI-2A is stored in table T).

Table T in FIG. 5A or extension table T' in FIG. 5B can naturally be extended so as to enable even more than two SIM cards (IMSI identifiers) to be associated with a single MSISDN number.

It is possible that two (or more) SIM cards with different subscribers are associated with the same MSISDN number. If a SIM card (e.g. A) earlier registered as active is involved in an ongoing call at the same time as a SIM card earlier registered as passive (in this case B) is being activated (it is being used for performing location updating), the location updating concerning the SIM card A is preferably delayed or rejected until the on-going call has been terminated. This kind of a situation can be communicated to the user of SIM card A e.g. with a call waiting function.

Call information relating to billing is transmitted to the network billing centre. The post-processing that takes place there is preferably supplemented by grouping the invoices in such a way that calls made using different SIM cards/IMSI numbers can be separated in them. If billing is controlled on the basis of the IMSI identifier, the extra information element E provided by the invention can be used for combining the different IMSI identifiers associated with one and the same MSISDN number to form one bill.

It is apparent to a person skilled in the art that, as technology advances, the basic idea of the invention can be implemented in many different ways. The above description relates to the GSM system and its derivatives, such as the DCS, but the invention is applicable to other data communication systems as well. For instance, it is not essential that the subscriber identity module is a removable GSM type SIM card. It is conceivable that as mobile stations become smaller, a physically removable SIM card like the current one will not necessarily be used any more. The division between the mobile equipment ME and the identity module SIM can be understood to be more logical than physical. It is also conceivable that as mobile stations become less expensive, a typical subscriber can have several mobile stations, of which he/she selects the one best suited to the environment concerned. The art of the invention can also be applied in a situation like this. An essential feature of the invention is that a mobile station comprises a subscriber identity module and that several identity modules are to be associated with one and the same subscriber identifier. The invention and its embodiments are therefore not restricted to the above examples, but they can vary within the scope of the claims.

What is claimed is:

1. A method for mobile station location updating in a cellular mobile communication system having at least one Home Location Register and at least one Visitor Location Register, and in which each subscriber is associated with a subscriber identifier, and the mobile station includes a subscriber identity module, the method comprising:

allocating at least two identity modules for each at least one subscriber identifier, each one of the at least two identity modules having an active state and a passive state, each one of the at least two modules being defined such that, at most, one of the at least two identity modules has a subscriber identifier active at any given time;

determining whether a subscriber identifier associated with location updating has at least two allocated identity modules;

if the location updating relates to a subscriber identifier to which at least two identity modules have been allocated, checking whether an identity module allocated to the subscriber identifier is registered as passive; and if the allocated identity module is registered passive, activating the allocating identity module and deactivating an identity module earlier registered as active.

2. The method of claim 1, further comprising rejecting or delaying the location updating until the on-going call is terminated if the identity module earlier registered as active is involved in an on-going call at the same time as location updating is being performed using an identity module earlier registered as passive.

3. The method of claim 2, further comprising communicating a successful or an attempted location updating relating to the identity module registered as passive during a call to a subscriber of the identity module earlier registered as active.

4. A mobile communication network element including a lookup table for associating an identity module with a subscriber identity, the network element comprising:

an extra information element within the lookup table configured to associate at least two identity modules with the same subscriber identifier for at least one subscriber such that, at most, one identity module is registered as active at any given time; and an activation signal configured to activate an identity module involved in location updating and a deactivation signal for deactivating another identity module earlier registered as active in response to the location updating of a subscriber having at least two allocated identity modules.

* * * * *